(12) United States Patent
Horiuchi

(10) Patent No.: US 12,304,247 B2
(45) Date of Patent: May 20, 2025

(54) PNEUMATIC TIRE

(71) Applicant: The Yokohama Rubber Co., LTD., Tokyo (JP)

(72) Inventor: Kenji Horiuchi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 487 days.

(21) Appl. No.: 17/593,610

(22) PCT Filed: Mar. 23, 2020

(86) PCT No.: PCT/JP2020/012745
§ 371 (c)(1),
(2) Date: Sep. 21, 2021

(87) PCT Pub. No.: WO2020/196415
PCT Pub. Date: Oct. 1, 2020

(65) Prior Publication Data
US 2022/0161603 A1  May 26, 2022

(30) Foreign Application Priority Data

Mar. 26, 2019 (JP) .................................. 2019-058671

(51) Int. Cl.
*B60C 11/01* (2006.01)
*B60C 11/03* (2006.01)
(Continued)

(52) U.S. Cl.
CPC .......... *B60C 11/01* (2013.01); *B60C 11/0304* (2013.01); *B60C 11/11* (2013.01);
(Continued)

(58) Field of Classification Search
CPC ... B60C 11/01; B60C 13/002; B60C 2200/14; B60C 11/033; B60C 11/0304
See application file for complete search history.

(56) References Cited

U.S. PATENT DOCUMENTS

D324,842 S *  3/1992 Covert ......................... D12/519
2008/0210355 A1  9/2008 Harvey et al.
(Continued)

FOREIGN PATENT DOCUMENTS

JP     2007-131222 A    5/2007
JP     2010-47251 A     3/2010
(Continued)

*Primary Examiner* — Justin R Fischer
*Assistant Examiner* — Wendy L Boss
(74) *Attorney, Agent, or Firm* — Thorpe North & Western

(57) ABSTRACT

A pneumatic tire includes side blocks in each of side regions adjacent to, on an outer side in a width direction, outermost side end portions of a tread portion in the width direction. For the number N1 and total area SS1 of the side blocks in a first side region located on a first side in the width direction, the number N2 and total area SS2 of the side blocks in a second side region located on a second side in the width direction, a land portion area TS1 in a first tread region of the tread portion on a side of the first side region, and a land portion area TS2 in a second tread region of the tread portion on a side of the second side region, relationships N1>N2, TS1>TS2, and $0.95 \leq (SS1 \times TS1)/(SS2 \times TS2) \leq 1.05$ are satisfied.

6 Claims, 3 Drawing Sheets

(51) Int. Cl.
*B60C 11/11* (2006.01)
*B60C 11/12* (2006.01)
*B60C 13/00* (2006.01)

(52) U.S. Cl.
CPC ............ *B60C 11/12* (2013.01); *B60C 13/002* (2013.01); *B60C 2200/14* (2013.01)

(56) References Cited

U.S. PATENT DOCUMENTS

2010/0212792 A1* 8/2010 Mita ................ B60C 11/033
  152/209.9
2017/0174007 A1* 6/2017 Kuwano ............... B60C 11/01
2018/0065415 A1* 3/2018 Sakamoto ............ B60C 11/01

FOREIGN PATENT DOCUMENTS

| JP | 2013-119277 A | 6/2013 |
| JP | 2016-007861 A | 1/2016 |
| JP | 2017-213925 A | 12/2017 |
| JP | 2018-2104 A | 1/2018 |
| WO | 2015/011964 A1 | 1/2015 |
| WO | 2017/208863 A1 | 12/2017 |
| WO | 2018/135485 A1 | 7/2018 |
| WO | 2019/022130 A1 | 1/2019 |

* cited by examiner

PNEUMATIC TIRE

TECHNICAL FIELD

The present technology relates to a pneumatic tire suitable as a tire for driving on unpaved roads, and in particular, relates to a pneumatic tire that provides improved running performance on unpaved roads, while enabling uniformity and tire weight balance to be successfully maintained.

BACKGROUND ART

As a pneumatic tire used for driving on unpaved roads such as an uneven ground, a muddy ground, a snowy road, a sandy ground, and a rocky area, a tire including a tread pattern and having a large groove area is generally adopted, the tread pattern mainly including lug grooves or blocks having an increased number of edge components. Furthermore, side blocks are provided in a side region more on the outer side in the tire width direction than a shoulder block positioned on the outermost side of a tread portion in the tire width direction. In such a tire, traction performance is obtained by the above-described lug groove or block biting into mud, snow, sand, stones, rocks, or the like on a road surface, while a large groove area preventing the clogging of a groove with mud, snow, sand, stones, rocks, or the like on a road surface, and thus running performance on unpaved roads is improved (for example, see Japan Unexamined Patent Publication Nos. 2016-007861 and 2013-119277).

Additionally, in a pneumatic tire, grooves or land portions may employ an asymmetrical pattern having different shapes between a first side and a second side of the tire equator. Tires including an asymmetrical pattern tend to have uniformity or weight balance degraded due to the asymmetrical structure. In particular, in a case where an asymmetrical structure is employed for tires including side blocks in side regions as described above, uniformity or weight balance may be affected by the asymmetric structure in the side regions as well as by the asymmetrical structure in the tread portion. This may lead to a significant adverse effect on uniformity or weight balance due to the asymmetrical structures. Thus, there is a demand for a measure for providing side blocks to improve running performance on unpaved roads, while successfully maintaining uniformity or tire weight balance even with the asymmetrical structures.

SUMMARY

The present technology provides a pneumatic tire that provides improved running performance on unpaved roads, while enabling uniformity and tire weight balance to be successfully maintained even with the asymmetrical patterns.

An embodiment of the present technology provides a pneumatic tire comprising a tread portion extending in a tire circumferential direction and having an annular shape, a pair of sidewall portions respectively disposed on both sides of the tread portion, and a pair of bead portions each disposed on an inner side of the sidewall portions in a tire radial direction, a plurality of side blocks that rise from an outer surface of the sidewall portion and that are defined by segmentation elements being arranged, along the tire circumferential direction, in each of a pair of side regions adjacent to, on an outer side in a tire width direction, an outermost end portion of the tread portion in the tire width direction, the segmentation elements being a combination of elements selected from the outermost end portion of the tread portion in the tire width direction, grooves extending in the tire circumferential direction or the tire width direction, and sipes extending in the tire circumferential direction or the tire width direction, a number $N1$ of the side blocks provided in a first side region located on a first side of the pair of side regions in the tire width direction and a number $N2$ of the side blocks provided in a second side region located on a second side of the pair of side regions in the tire width direction satisfying a relationship $N1>N2$, a land portion area $TS1$ in a first tread region of the tread portion located closer to the first side region than a tire equator and a land portion area $TS2$ in a second tread region of the tread portion located closer to the second side region than the tire equator satisfying $TS1>TS2$, and the land portion area $TS1$ in the first tread region, the land portion area $TS2$ in the second tread region, a total area $SS1$ of the side blocks provided in the first side region, and a total area $SS2$ of the side blocks provided in the second side region satisfying a relationship $0.95 \leq (SS1 \times TS1)/(SS2 \times TS2) \leq 1.05$.

In the present technology, as described above, in a tire including a plurality of side blocks provided in side regions coming into contact with the ground in a case where the tire is buried in the mud or the like or a vehicle body is tilted, the number $N1$ of side blocks in the first side region is relatively increased to ensure large groove components in the side blocks. This provides improved traction characteristics on soft road surfaces of mud roads, snowy roads, sandy ground, and the like, allowing increase in running performance on such road surfaces (mud performance and snow performance). On the other hand, the number $N2$ of side blocks in the second side region is relatively reduced (that is, the sizes of the individual blocks are increased) to ensure block rigidity. This provides improved traction characteristics on hard road surfaces of rocky areas and the like, allowing improvement in running performance on such road surfaces (rock performance). By sharing the functions between a first side and a second side of the tire as described above, running performance on various unpaved roads can be improved. Similarly, in the tread portion, in the first tread region, the land portion area $TS1$ is relatively large to ensure land portion rigidity. This provides improved traction characteristics on hard road surfaces of rocky areas and the like, allowing improvement in running performance on such road surfaces (rock performance). On the other hand, in the second tread region, the land portion area $TS2$ is relatively small to provide large groove components. This provides improved traction characteristics on soft road surfaces of mud roads, snowy roads, sandy ground, and the like, allowing increase in running performance on such road surfaces (mud performance and snow performance). Thus, in the tread portion as well, by sharing the functions between the first side and the second side of the tire, running performance on various unpaved roads can be improved.

Furthermore, in a case where the functions are shared between the first side and the second side of the tire, the first side region where the number $N1$ of side blocks is relatively increased (i.e. the total block area $SS1$ is relatively small) and the first tread region where the land portion area $TS1$ is relatively increased are disposed on the same side, the second side region where the number $N2$ of side blocks is relatively reduced (i.e. the total block area $SS2$ is relatively increased) and the second tread region where the land portion area $TS2$ is relatively small are disposed on the same side, and the total areas $SS1$, $SS2$ of the side blocks and the land portion areas $TS1$, $TS2$ satisfy the above-described relationship. This reduces a difference in weight between the first side and the second side of the tire equator, allowing improvement in uniformity and weight balance.

In the present technology, preferably, the area ratio of the land portions to the first tread region and the area ratio of the land portions to the second tread region are each from 40% to 60%. Providing the proper area for the land portions in the tread portion as described above is advantageous in achieving both running performance on soft road surfaces of mud roads, snowy roads, sandy ground, and the like (mud performance and snow performance) and running performance on hard road surfaces of rocky areas and the like (rock performance) in a compatible manner.

In an embodiment of the present technology, preferably, a ratio L/SH of a vertical distance L, from the outermost end portion in the tire width direction of the tread portion to the innermost point in the tire radial direction of the side region, to a tire cross-sectional height SH is from 0.10 to 0.30. By setting the range in the side region within which the side blocks are provided as described above, the side blocks properly come into contact with a road surface (mud and the like or rocks) during running on unpaved roads, and this is advantageous in improving running performance on unpaved roads.

In an embodiment of the present technology, preferably, a rising height H of the side blocks from the outer surfaces of the sidewall portions is from 5 mm to 13 mm. Accordingly, the side blocks sufficiently rise and have an appropriate size, and thus this becomes advantageous in improving running performance on unpaved roads.

In an embodiment of the present technology, preferably, the segmentation element partially includes a shallow grooved region having a relatively small groove depth, the groove depth of the shallow grooved region is from 40% to 45% of the rising height H of the side blocks from the outer surfaces of the sidewall portions, and a total length of the shallow grooved region along a contour line of a road contact surface of the side blocks is from 15% to 35% of an entire length of the contour line of the road contact surface of the side blocks. Accordingly, groove volume and block rigidity in the side regions can be ensured in a well-balanced manner, and this is advantageous in achieving both running performance on soft road surfaces of mud roads, snowy roads, sandy ground, and the like (mud performance and snow performance) and running performance on hard road surfaces of rocky areas and the like (rock performance) in a compatible manner.

In an embodiment of the present technology, "tire ground contact edge" is either end portion in a ground contact region in the tire axial direction, which is formed when a regular load is applied to the tire in a state where the tire mounted on a regular rim and inflated to a regular internal pressure is placed vertically on a flat surface. "Regular rim" refers to a rim defined by a standard for each tire according to a system of standards that includes standards with which tires comply, and is a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). In the system of standards including standards with which tires comply, "regular internal pressure" refers to air pressure defined by each of the standards for each tire and is "maximum air pressure" defined by JATMA, a maximum value indicated in the table "TIRE LOAD LIMITS AT VARIOUS COLD INFLATION PRESSURES" defined by TRA, or "INFLATION PRESSURE" defined by ETRTO. However, in a case where a tire is a tire for a passenger vehicle, "regular internal pressure" is 180 kPa. "Regular load" is a load defined by a standard for each tire according to a system of standards that includes standards on which tires are based, and refers to a "maximum load capacity" in the case of JATMA, refers to the maximum value in the table of "TIRE LOAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Configurations of embodiments of the present technology will be described in detail below with reference to the accompanying drawings.

Figure 1:
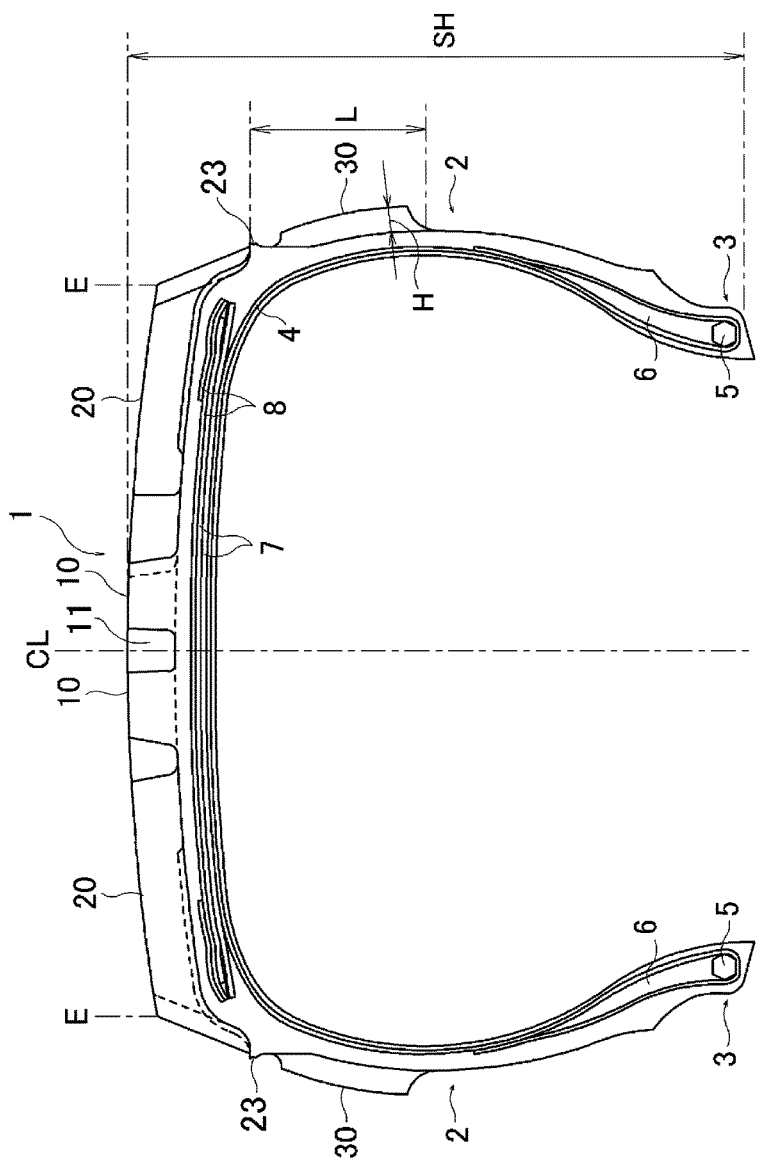
FIG. 1 is a meridian cross-sectional view of a pneumatic tire according to an embodiment of the present technology.

As illustrated in FIG. 1, a pneumatic tire of an embodiment of the present technology includes a tread portion 1, a pair of sidewall portions 2 disposed on both sides of the tread portion 1, and a pair of bead portions 3 disposed in the sidewall portions 2 at an inner side in a tire radial direction. In FIG. 1, reference sign CL denotes a tire equator, and reference sign E denotes a ground contact edge. Additionally, FIG. 1 is a meridian cross-sectional view, and accordingly, although not illustrated, each of the tread portion 1, the sidewall portions 2, and the bead portions 3 extends in a tire circumferential direction to form an annular shape. Thus, the basic structure of the toroidal shape of the pneumatic tire is configured. Although the description using FIG. 1 is basically based on the illustrated meridian cross-sectional shape, all of the tire components each extend in the tire circumferential direction and form the annular shape.

In the following description, the left side of the drawing is referred to as a "first side" and the right side of the drawing is referred to as a "second side" as necessary. However, for the pneumatic tire according to an embodiment of the present technology, a mounting direction with respect to the vehicle is not designated. In a case where the pneumatic tire of the present technology is mounted to the vehicle, either the "first side" or the "second side" may face inward or outward with respect to the vehicle.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, from 0° to 5°.

The present technology may be applied to such a pneumatic tire having a general cross-sectional structure; however, the basic structure is not limited to the aforementioned structure.

Figure 2:
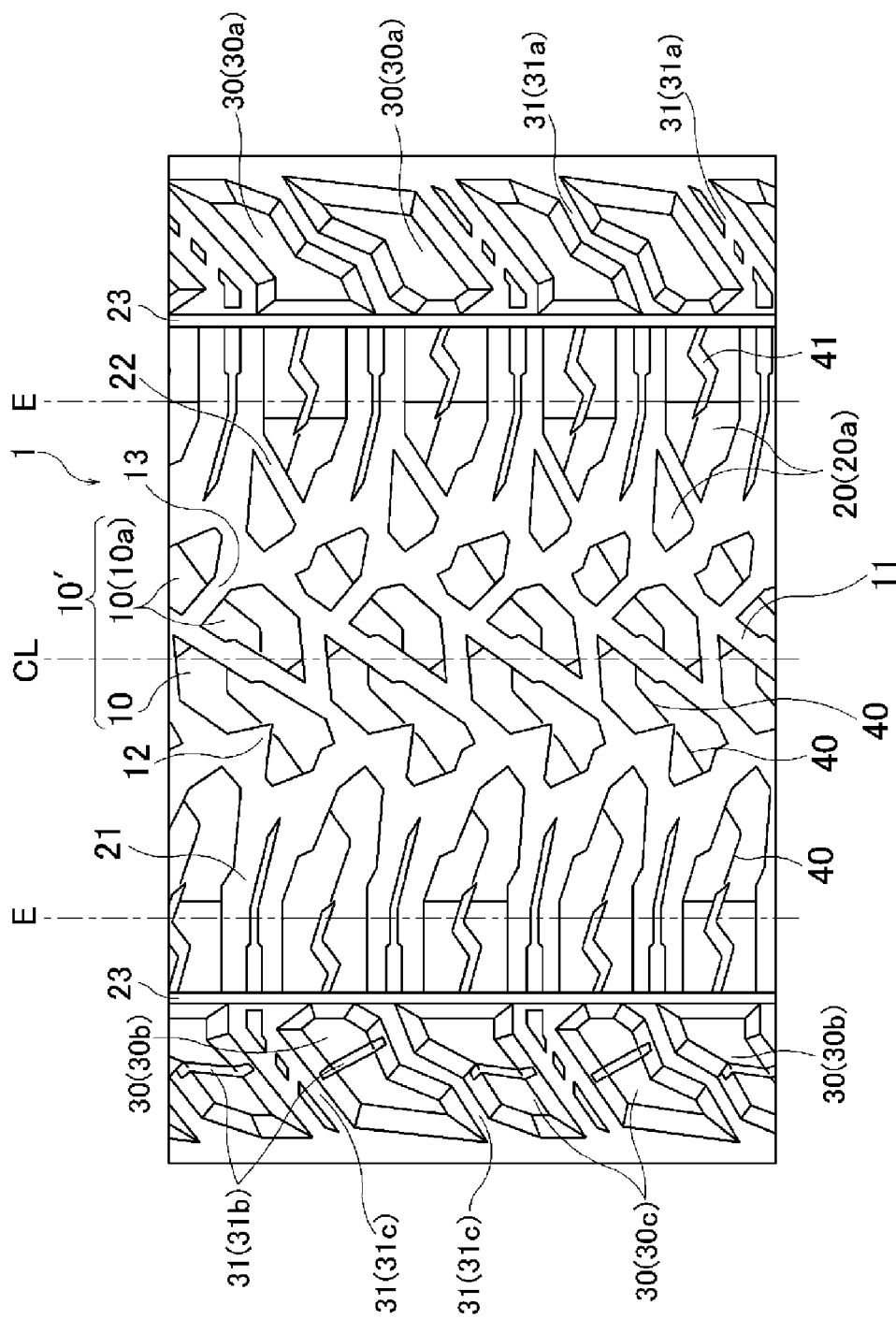
FIG. 2 is a front view illustrating a tread surface of the pneumatic tire according to the embodiment of the present technology.

In the pneumatic tire illustrated in FIGS. 1 and 2, a plurality of center blocks 10 are provided in a center region of an outer surface of the tread portion 1. Additionally, a plurality of shoulder blocks 20 are provided in a shoulder region of the outer surface of the tread portion 1. In other words, two types of blocks (the center blocks 10 and the shoulder blocks 20) are provided on each of both sides of the tire equator CL in the outer surface of the tread portion 1. Then, a region where the center blocks 10 located on the tire equator CL side are disposed is the center region, and a region where the shoulder blocks 20 located further on an outer side than the center blocks 10 in the tire width direction are disposed is the shoulder region.

The center blocks 10 are arranged in pairs (block pairs 10') and inclined grooves 11 extending at an incline with respect to the tire circumferential direction are interposed between the pairs of center blocks 10. The center block 10 on the first side (the left side of the tire equator CL in the drawing) of the block pair 10' extends across the tire equator CL from the first side to the second side of the tire equator CL, and the center block 10 on the second side extends across the tire equator CL from the second side to the first side of the tire equator CL. Additionally, a notch 12 including two wall surfaces connected in a V-shape in a tread contact surface is provided in a wall surface (wall surface opposite to an inclined groove 11) on the outer side of each of the center blocks 10 in the tire width direction. Furthermore, the center block 10 on the second side is provided with an auxiliary groove 13 that extends from an apex position where two wall surfaces of the notch 12 connect in a V-shape such that the center block 10 is segmented into two small blocks 10a.

As described above, the shoulder blocks 20 are blocks disposed on the outer side of the center blocks 10 in the tire width direction. In the illustrated example, the plurality of shoulder blocks 20 extending from the outer side of the center blocks 10 in the tire width direction to the ground contact edge E are arranged at intervals in the tire circumferential direction. A shoulder groove 21 extending in the tire width direction is formed between the plurality of shoulder blocks 20. The shoulder block 20 on the second side is further provided with an auxiliary groove 22 that connects the shoulder grooves 21 adjacent in the tire circumferential direction and that segments each block into two small blocks 20a. Note that in the following description, an outermost end portion in the tire width direction in the meridian cross-section of the shoulder blocks 20 is considered to be an outermost end portion in the tire width direction of the tread portion 1, and a region adjacent to the end portion is assumed to be a side region (a region where a side block 30 described below is formed). In the illustrated example, a ridge 23 continuously extending over the entire circumference of the tire is provided in the outermost end portion in the tire width direction (the outermost end portion of the tread portion 1 in the tire width direction) in the meridian cross-section of the shoulder blocks 20.

In the illustrated example, a sipe 40 is formed in each of the center blocks 10 and the shoulder blocks 20 as described above. Additionally, shallow grooves 41 extending while bending along the tire width direction are provided in side surfaces on an outer side of the shoulder blocks 20 in the tire width direction.

An embodiment of the present technology relates to a structure of the side block 30 described below provided in the side region that comes into contact with the ground in a case where the tire is buried in the mud or the like or the vehicle body is tilted, and specifies, for the tread portion 1, land portion areas and the like. Thus, the structures of grooves and blocks formed between the outermost end portions of the tread portion 1 in the tire width direction are not particularly limited as long as the tread pattern mainly includes blocks and is suitable for running performance on unpaved roads as in the illustrated example.

A plurality of the side blocks 30 rising from an outer surface of the sidewall portion 2 are formed in the side region located on an outer side of the shoulder region in the tire width direction. A rising height H of the side blocks 30 is preferably from 5 mm to 13 mm. The plurality of side blocks 30 are arranged over the entire circumference of the tire along the tire circumferential direction. Particularly, in the illustrated example, the side blocks 30 are disposed at extension positions on the outer side of the shoulder blocks 20 in the tire width direction, and a groove between the side blocks 30 adjacent in the tire circumferential direction is substantially continuous with the shoulder groove 21 between the shoulder blocks 20 adjacent in the tire circumferential direction. A shape of an individual block of the side blocks 30 is not particularly limited, but preferably, the side blocks 30 adjacent in the tire circumferential direction at least partially overlap as viewed along the tire radial direction. For example, the side blocks 30 illustrated have a substantially L-shape in which a portion extending in the tire width direction and a portion extending in the tire circumferential direction are combined, and thus the side blocks 30 adjacent at least partially overlap.

The individual side block 30 is formed by defining at least three directions by segmentation elements 31. In other words, a land portion rising from the outer surface of the sidewall portion 2 is defined by a plurality of the segmentation elements 31, and the side blocks 30 are formed. The segmentation elements 31 refer to any of the outermost end portion in the tire width direction of the tread portion 1, a groove extending in the tire circumferential direction or the tire width direction, and a sipe extending in the tire circumferential direction or the tire width direction. Additionally, in a case where the segmentation elements 31 are elements (a groove or a sipe) having a depth, the segmentation elements 31 have a depth that is not less than 40% of the rising height H of the side blocks 30. In other words, a groove or a sipe having a groove depth of less than 40% of the rising height of the side blocks 30 is not considered as the segmentation elements 31 that define the side blocks 30. A plurality of types of the segmentation elements 31 can be combined in a discretionary manner.

For example, in the illustrated example, the side region on the second side includes side blocks 30a formed using, as segmentation elements, the outermost end portion of the tread portion 1 in the tire width direction (ridge 23) and a pair of grooves 31a extending in the tire width direction. Additionally, the side region on the first side is provided with side blocks 30b formed using, as the segmentation elements 31, the outermost end portion of the tread portion 1 in the tire width direction (ridge 23), a groove 31b extending in the tire circumferential direction, and a pair of grooves 31c extending in the tire width direction; and side blocks 30c formed using, as the segmentation elements 31, the groove 31b extending in the tire circumferential direction and the pair of grooves 31c extending in the tire width direction. Note that regarding the segmentation elements 31, the outermost end portion in the tire width direction of the tread portion 1 does not have a depth unlike the grooves or the sipes, but in an embodiment of the present technology, the outermost end portion in the tire width direction of the tread portion 1 is considered as an element that defines the side blocks 30. For example, even in a case where the ridge 23 continuously extending in the tire circumferential direction is present in the outermost end portion in the tire width direction of the tread portion 1, and the side blocks 30 are connected by the ridge 23, the outermost end portion (that is, the ridge 23) in the tire width direction of the tread portion 1 in an embodiment of the present technology is considered as the segmentation element 31 that defines the side blocks 30. Thus, individual portions excluding the ridge 23 become the side blocks 30 that are separate from one another.

In an embodiment of the present technology, in a case where the side blocks 30 are provided in the pair of side regions on both sides of the tire, the number of side blocks 30 differs between a side region on the first side in the tire width direction (hereinafter referred to as a "first side region") and a side region on the second side in the tire width direction (hereinafter referred to as a "second side region"). That is, assuming that the number of the side blocks 30 provided in the first side region is N1 and the number of the side blocks 30 provided in the second side region is N2, the number N1 and the number N2 satisfy the relationship N1>N2. For example, in the illustrated example, because the side blocks 30 provided in the first side region on the first side (left side in the figure) are more finely defined than the side blocks 30 provided in the second side region on the second side (right side in the figure), the number N1 is greater than the number N2.

In this way, the number of side blocks 30 differs between the pair of side regions, and the number N1 of side blocks in the first side region is relatively increased, providing large groove components in the side region. This provides improved traction characteristics on soft road surfaces of mud roads, snowy roads, sandy ground, and the like, allowing increase in running performance on such road surfaces (mud performance and snow performance). On the other hand, the number N2 of side blocks in the second side region is relatively reduced (that is, the sizes of the individual blocks are increased) to ensure block rigidity. This provides improved traction characteristics on hard road surfaces of rocky areas and the like, allowing improvement in running performance on such road surfaces (rock performance). By sharing the functions between the first side and the second side of the tire as described above, running performance on various unpaved roads can be improved.

At this time, in the tread portion 1, the land portion area differs between the first side and the second side of the tire equator CL. Specifically, in a case where a first tread region refers to the first side (first side region side) of the tread portion 1 with respect to the tire equator CL, and a second tread region refers to the second side (second side region side) of the tread portion with respect to the tire equator CL, a land portion area TS1 in the first tread region and a land portion area TS2 in the second tread region satisfy the relationship TS1>TS2. For example, in the illustrated example, the center blocks 10 and shoulder blocks 20 provided in the second tread region on the second side (right side of the figure) are finely divided by a greater number of grooves than the center blocks 10 and shoulder blocks 20 provided in the first tread region on the first side (left side of the figure). Thus, the land portion area TS1 is greater than the land portion area TS2. Note that the land portion areas TS1, TS2 are the sum of the areas of the top surfaces of blocks (center blocks 10 and shoulder blocks 20) included in the first tread region or the second tread region.

In this way, in the tread portion 1, the land portion area TS1 is relatively large in the first tread region, ensuring land portion rigidity. This provides improved traction characteristics on hard road surfaces of rocky areas and the like, and running performance (rock performance) on such road surfaces can be improved. On the other hand, in the second tread region, the land portion area TS2 is relatively small to provide large groove components. This provides improved traction characteristics on soft road surfaces of mud roads, snowy roads, sandy ground, and the like, allowing increase in running performance on such road surfaces (mud performance and snow performance). Thus, in the tread portion as well, by sharing the functions between the first side and the second side of the tire, running performance on various unpaved roads can be improved.

In a case where the number of blocks and the balance of the land portion areas are as described above, the first side region where the number N1 of side blocks is relatively increased (that is, a total area SS1 of the side blocks provided in the first side region is relatively small) and the first tread region where the land portion area TS1 is relatively large are disposed on the same side, and the second side region where the number N2 of side blocks is relatively reduced (that is, a total area SS2 of the side blocks provided in the second side region is relatively large) and the second tread region where the land portion area TS2 is relatively small are disposed on the same side. In this configuration, furthermore, the land portion area TS1 in the first tread region, the land portion area TS2 in the second tread region, the total area SS1 of the side blocks provided in the first side region, and the total area SS2 of the side blocks provided in the second side region satisfy the relationship $0.95 \leq (SS1 \times TS1)/(SS2 \times TS2) \leq 1.05$. Such a relationship reduces the difference in weight between the first side and the second side of the tire equator CL, allowing improvement in uniformity and weight balance. Note that the side blocks 30 may include an non-flat top surface and thus that the area of the side block 30 corresponds to the area of a cut section (top surface) obtained by cutting the side block 30 parallel to the surface of the sidewall portion 2, at a position corresponding to 40% of the maximum height of the side block 30 from the surface of the sidewall portion 2. Additionally, the total areas SS1 and SS2 are the sum of the areas of the individual side blocks 30 measured as described above.

Thus, in the pneumatic tire according to an embodiment of the present technology, the relationship between the first tread region located on the first side and the second tread region located on the second side of the tire equator CL is set as described above; the relationship between the first side region located on the first side and the second side region located on the second side of the tire equator CL is set as described above; and furthermore, the relationship between the tread portion and the side region located on the same side on the first side or the second side of the tire equator CL is set as described above. This provides improved running performance on unpaved roads, while enabling uniformity and tire weight balance to be successfully maintained even with an asymmetrical pattern.

In a case where the number N1 of side blocks 30 provided in the first side region is the same as the number N2 of side blocks 30 provided in the second side region or the land portion area TS1 in the first tread region is the same as the land portion area TS2 in the second tread region, the function sharing between the first side and the second side of the tire as described above is prevented, thus precluding effective increase in the running performance on unpaved roads. In a case where the magnitude relationships in the number N1, N2 of side blocks, the total area SS1, SS2 of the side blocks, and the land portion area TS1, TS2 between the first tread region and the second tread region and between the first side region and the second side region deviate from the above-described relationships, the difference in weight between the first side and the second side of the tire equator CL increases, and thus uniformity and weight balance may be degraded. When (SS1×TS1)/(SS2×TS2) is less than 0.95 or greater than 1.05, the difference in weight between the first side and the second side of the tire equator CL increases, and thus uniformity and weight balance may be degraded.

In the tread portion 1, the land portion areas TS1, TS2 may satisfy the relationship described above. However, furthermore, the area ratio of the land portions to the first tread region and the area ratio of the land portions to the second tread region are preferably each from 40% to 60%. It is the ratio of the land portion areas TS1, TS2 to the overall area of the first tread region or the second tread region (½ of the area of the tread portion 1 between the ground contact edges E on both sides of the tire). Providing the proper area for the land portions in the tread portion 1 as described above is advantageous in achieving both running performance on soft road surfaces of mud roads, snowy roads, sand ground, and the like (mud performance and snow performance) and running performance on hard road surfaces of rocky areas and the like (rock performance) in a compatible manner. The area ratio of the land portions to each region being less than 40% reduces block rigidity, preventing sufficient running performance on hard road surfaces (rock performance) from being ensured. The area ratio of the land portions to each region exceeding 60% makes provision of a sufficient groove area difficult, and thus running performance on soft road surfaces (mud performance and snow performance) may be degraded.

As described above, in a case where the number of the side blocks 30 is varied between the first side and the second side of the tire, and the total area SS2 of the side blocks 30 provided in the side region on the second side is preferably from 85% to 115% of the total area SS1 of the side blocks 30 provided in the side region on the first side. In a case where similar total areas of the side blocks 30 are set for the first side and the second side of the tire, the number N2 is relatively reduced to enable a reliable increase in the sizes of the individual side blocks 30 to improve rock performance, and the number N1 is relatively increased to enable a reliable reduction in the sizes of the individual side blocks 30 to improve mud performance and snow performance. In this case, in a case where the relationship between the total area of the side blocks 30 on the first side and the total area of the side blocks 30 on the second side deviates from the range described above, it is difficult to set the shapes (sizes) of the side blocks 30 on the first and second sides of the tire in a proper relationship using only the number of the side blocks 30.

In a case where the side blocks 30 are provided, the ratio of the total area of the side blocks 30 provided in each side region, in the first side region and the second side region respectively, to the area of each side region may preferably be set to from 15% to 70% such that the side blocks 30 effectively act on running performance on unpaved roads. In this manner, the side blocks 30 occupy a sufficient range of the side regions, and thus running performance on unpaved roads can be exerted effectively. When the percentage of the total area of the side blocks 30 is less than 15%, since the side blocks 30 are sparsely scattered, it becomes difficult to sufficiently improve running performance on unpaved roads. When the percentage of the total area of the side blocks 30 exceeds 70%, since area of the grooves and the sipes between the side blocks 30 decreases and an edge effect is difficult to obtain, it becomes difficult to sufficiently improve running performance on unpaved roads. Additionally, when the individual block of the side blocks 30 is too small, since it becomes difficult to obtain an edge effect sufficient for exerting running performance on an unpaved road surface, area of the individual side blocks 30 is preferably, for example, not less than 4% of the area of the side region. Note that in an embodiment of the present technology, area of side region refers to area of a region between the outermost end portion in the tire width direction of the tread portion 1 and an outermost end in the tire width direction of the side blocks 30.

Figure 3A:
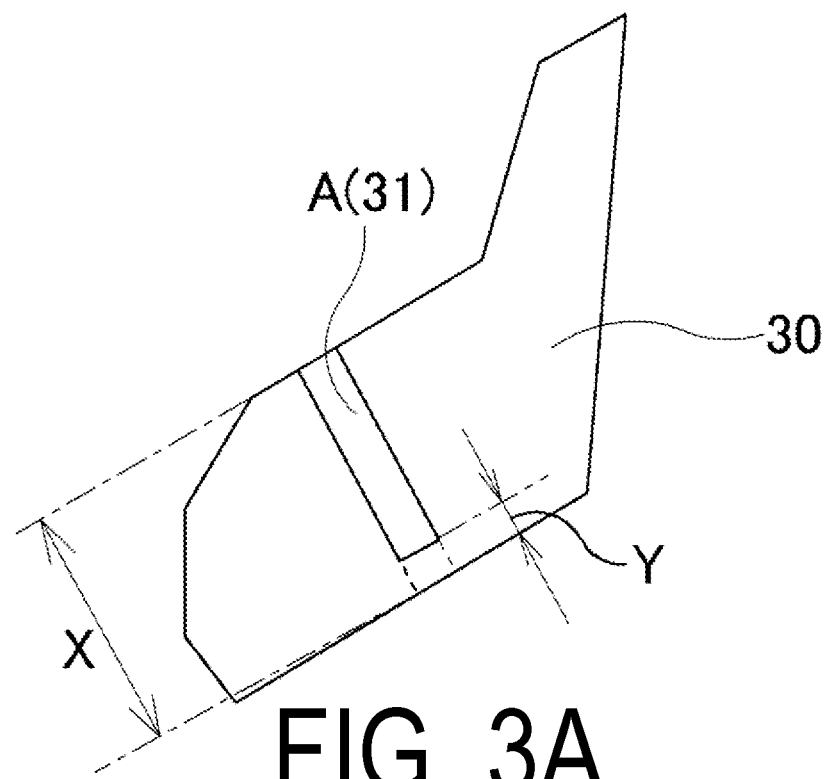
FIGS. 3A-3B are schematic diagrams explaining a segmentation element.
Figure 3B:
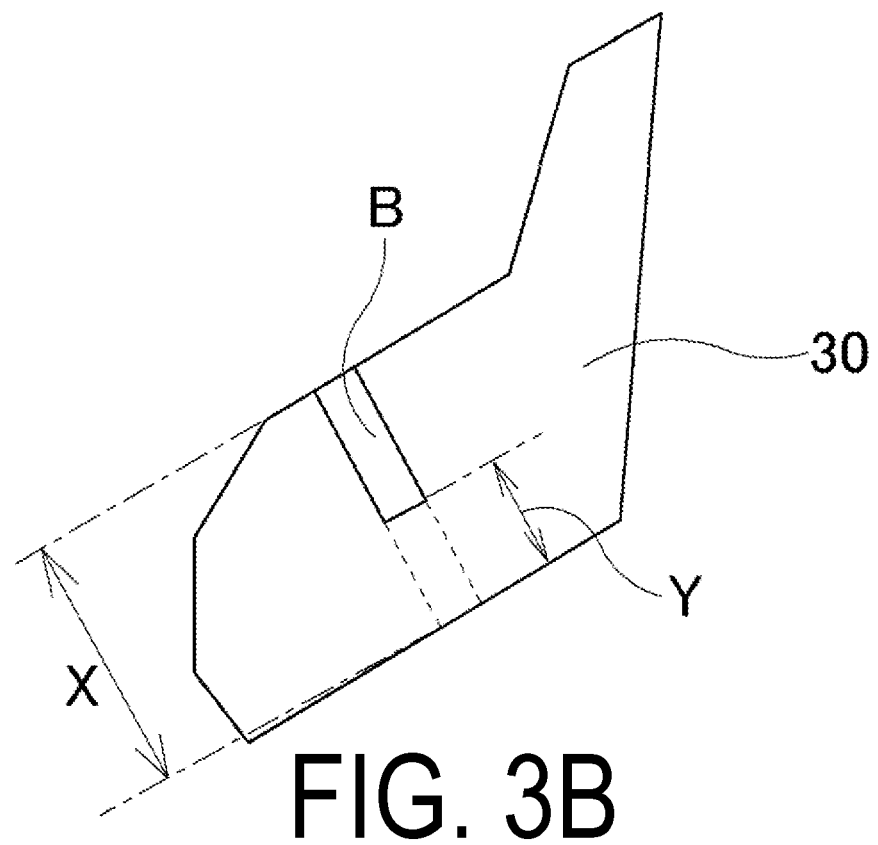

In an embodiment of the present technology, the side blocks 30 are defined by the segmentation elements 31, but entire circumference of the side blocks 30 is not required to be completely defined (segmented). For example, in two types of the side blocks 30 schematically illustrated in FIGS. 3(*a*) and 3(*b*), a groove A and a groove B that terminate in the blocks are formed, respectively. Among these, as illustrated in FIG. 3A, in a case where the groove A has a sufficient length, the groove A can be considered as the segmentation element 31. That is, when a percentage of a length Y of a portion not segmented by the groove A with respect to a length X of an imaginary groove (see a dashed line in the diagram) in which the groove A (the segmentation element 31) extends is less than 15%, the groove A (the segmentation element 31) substantially segments the block, and portions of the block located on both sides of the groove A (the segmentation element 31) can be considered as being defined as separate blocks. On the other hand, in a case where the groove B is short as in FIG. 3B (in a case where the percentage of the length described above is not less than 15%), the block is considered as not being segmented.

The number N2 of the side blocks 30 provided in the second side region may preferably be 25 or more, and more preferably 30 or more and 45 or less. Additionally, the ratio N1/N2 of the number N1 of the side blocks 30 provided in the first side region to the number N2 of the side blocks 30 provided in the second side region may preferably be 1.5 or more and 3.5 or less. Setting the numbers of the side blocks 30 in this manner causes the numbers and sizes of the side blocks 30 to be successfully balanced between the sides, and is advantageous in achieving mud performance and snow performance and rock performance in a compatible manner. When the number N2 of the side blocks 30 is less than 25, the number of the side blocks 30 is too reduced, making sufficient improvement in rock performance difficult. A ratio N1/N2 of less than 1.5 reduces the difference in the number of the side blocks 30 between the first side and the second side of the tire, preventing sufficient exertion of the effect of varying the number of the side blocks 30 between the first and second sides of the tire. A ratio N1/N2 of greater than 3.5 leads to an excessively increased or reduced number of side blocks on the first or second side of the tire, making well-balanced delivery of mud performance and snow performance and rock performance difficult.

The side blocks 30 are provided in the side regions adjacent to the shoulder regions, and a ratio L/SH of a vertical distance L, from the outermost end portion in the tire width direction of the tread portion 1 to the innermost point in the tire radial direction of the side region, to a tire cross-sectional height SH may preferably be from 0.10 to 0.30. In a case where the range in the side region within which the side blocks 30 are provided is set as described above, during running on unpaved roads, the side blocks 30 come into proper contact with a road surface (mud, snow, rocks, or the like), and this is advantageous in effectively delivering mud performance and snow performance and rock performance. When the ratio L/SH is less than 0.10, since the range where the side blocks 30 are provided becomes small, an effect of improving running performance (particularly, rock performance) on unpaved roads cannot be obtained sufficiently. When the ratio L/SH exceeds 0.30, since the range where the side blocks 30 are provided becomes large, and an effect of a weight increase due to the side blocks 30 increases, there is concern that mud performance and normal running performance (steering stability performance) may be affected.

The segmentation elements 31 defining the side blocks 30 preferably partially include a shallow grooved region having a relatively small groove depth. The shallow grooved region can be formed by making at least a portion of the groove or the sipe that is the segmentation element 31 shallow. The groove depth of the shallow grooved region may preferably be from 40% to 45% of the rising height H of the side blocks 30. Additionally, a total length of the shallow grooved region along a contour line of a road contact surface of the side blocks 30 may preferably be from 15% to 35% of the entire length of the contour line of the road contact surface of the side blocks 30. Accordingly, groove volume and block rigidity can be ensured in a well-balanced manner, and this becomes advantageous in providing mud performance and rock performance in a compatible manner. When the groove depth of the shallow grooved region is less than 40% of the rising height H, the blocks are not sufficiently segmented in the shallow grooved region, and there is concern that the side blocks 30 cannot be defined appropriately. When the groove depth of the shallow grooved region exceeds 45% of the rising height H, the groove depth in the shallow grooved region does not become sufficiently shallow, and an effect of providing the shallow grooved region is not exerted sufficiently. When the total length of the shallow grooved region is less than 15% of the entire length of the contour line of the road contact surface of the side blocks 30, the shallow grooved region becomes too small, and thus the effect of providing the shallow grooved region is not exerted sufficiently. When the total length of the shallow grooved region exceeds 35% of the entire length of the contour line of the road contact surface of the side blocks 30, the shallow grooved region becomes too large, and the blocks are not sufficiently segmented and there is concern that the side blocks 30 cannot be defined appropriately.

As described above, the pneumatic tire of an embodiment of the present technology may be mounted such that either the "first side" or the "second side" faces inward or outward with respect to the vehicle. However, in a case where the above-described first side (the side on which the number N1 is relatively increased and the land portion area TS1 is relatively large) is mounted to the vehicle in such a manner as to face outward with respect to the vehicle, the effect of improving noise performance can also be added. That is, in a case where the number of side blocks N1 exposed to the outer side of the vehicle increases, wind noise can be suppressed. In a case where the land portion area TS1 is large and the tread portion 1 located on the vehicle outer side (first tread region) has a small groove area, noise diverging toward the vehicle outer side through the grooves can be suppressed.

EXAMPLES

Twenty-two types of pneumatic tires according to Comparative Examples 1 to 4 and according to Examples 1 to 18 were manufactured. The tires had a tire size of LT265/70R17, and had a basic structure as illustrated in FIG. 1. Tables 1 and 2 indicate settings, based on the tread pattern in FIG. 2, for the number N1 of the side blocks located on the first side of the tire equator; the number N2 of the side blocks located on the second side of the tire equator; the land portion area TS2; the ratio (SS1×TS1)/(SS2×TS2) of the product of total area SS1 of the side blocks and the land portion area TS1 to the product of the total area SS2 of the side blocks and the land portion area TS2; the rising height of the side blocks; the ratio L/SH of the vertical distance L, from the outermost end portion of the tread portion in the tire width direction to the innermost point of the side region in the tire radial direction, to the tire cross-sectional height SH; the presence of shallow grooved regions; the ratio of the groove depth of the shallow grooved region to the rising height H; and the ratio of the total length of the shallow grooved regions to the entire length of contour line of the road contact surface of the side blocks.

Note that the side facing outward with respect to the vehicle when the pneumatic tires as described above are mounted to the vehicle is referred to as the "first side", and the side facing the inner side with respect to the vehicle when the pneumatic tires are mounted to the vehicle is referred to as the "second side".

The pneumatic tires were evaluated for mud performance, rock performance, snow performance, and uniformity using evaluation methods described below, and the results are also indicated in Tables 1 and 2.

Mud Performance

The test tires were mounted on wheels having a rim size of 17×7.0 J, inflated to air pressure of 250 kPa, and mounted on a test vehicle (four wheel drive vehicle), and sensory evaluation on traction characteristics was performed by a test driver on a test course including the muddy ground. Evaluation results are expressed as index values, with the value of Comparative Example 1 expressed as an index value of 100. The larger index values mean excellent mud performance.

Rock Performance

The test tires are mounted on wheels having a rim size of 17×7.0 J, inflated to air pressure of 250 kPa, and mounted on a test vehicle (four wheel drive vehicle), and sensory evaluation on traction characteristics was performed by a test driver on a test course including rocky areas. Evaluation results are expressed as index values, with the value of Comparative Example 1 expressed as an index value of 100. The larger index values mean excellent rock performance.

Snow Performance

The test tires were mounted on wheels having a rim size of 17×7.0 J, inflated to an air pressure of 250 kPa, and mounted on a test vehicle (four wheel drive vehicle), and sensory evaluation on traction characteristics was performed by a test driver on a test course including icy and snowy roads. Evaluation results are expressed as index values, with the value of Comparative Example 1 expressed as an index value of 100. The larger index values mean excellent snow performance.

Uniformity

Uniformity was evaluated using Radial Force Variation (RFV) testing and Dynamic Balance (dB) testing. In the RFV testing, 1000 test tires were manufactured, and radial force variation testing (RFV testing) was performed under conditions in accordance with JASO C607, and the number of tires with an RFV value reaching an acceptable value was measured. In the DB testing, measurement tires were set on an upper rim and a lower rim provided on a generally rotating main shaft, and a centrifugal force and a moment generated during rotation were measured and calculated. Thus, the amount of unbalance in the tire was calculated. Evaluation results are expressed as index values with Comparative Example 1 being assigned as 100 based on the results of the RFV testing and the DB testing. Larger index values indicate high RFV DB yield and stable provision of tires with high uniformity and good weight balance.

TABLE 1-1

| | | Comparative Example 1 | Comparative Example 2 | Comparative Example 3 | Comparative Example 4 |
|---|---|---|---|---|---|
| First side (Vehicle outer side) | Number N1 | 20 | 30 | 20 | 20 |
| | Land portion area TS1 | 57 | 57 | 57 | 55 |
| Second side (Vehicle inner side) | Number N2 | 20 | 20 | 30 | 20 |
| | Land portion area TS2 | 57 | 57 | 57 | 60 |
| (SS1 × TS1)/(SS2 × TS2) | | 1.0 | 1.1 | 0.9 | 1.1 |
| Rising height H mm | | 8 | 8 | 8 | 8 |
| Ratio L/SH | | 0.2 | 0.2 | 0.2 | 0.2 |
| Shallow grooved region | Present? | No | No | No | No |
| | Ratio of groove depth % | — | — | — | — |
| | Ratio of total length % | — | — | — | — |
| Mud Performance Index value | | 100 | 102 | 102 | 103 |
| Rock performance Index value | | 100 | 102 | 103 | 101 |
| Snow performance Index value | | 100 | 101 | 100 | 101 |
| Uniformity Index value | | 100 | 93 | 93 | 95 |

TABLE 1-2

| | | Example 1 | Example 2 | Example 3 | Example 4 |
|---|---|---|---|---|---|
| First side (Vehicle outer side) | Number N1 | 50 | 50 | 50 | 50 |
| | Land portion area TS1 | 60 | 60 | 60 | 60 |
| Second side (Vehicle inner side) | Number N2 | 20 | 30 | 30 | 30 |
| | Land portion area TS2 | 55 | 55 | 50 | 53 |
| (SS1 × TS1)/(SS2 × TS2) | | 1.0 | 1.0 | 1.0 | 0.95 |
| Rising height H mm | | 8 | 8 | 8 | 8 |
| Ratio L/SH | | 0.2 | 0.2 | 0.2 | 0.2 |
| Shallow grooved region | Present? | No | No | No | No |
| | Ratio of groove depth % | — | — | — | — |
| | Ratio of total length % | — | — | — | — |
| Mud Performance Index value | | 104 | 105 | 106 | 105 |
| Rock performance Index value | | 102 | 102 | 101 | 101 |
| Snow performance Index value | | 104 | 105 | 106 | 105 |
| Uniformity Index value | | 101 | 102 | 101 | 100 |

TABLE 1-3

|  |  | Example 5 | Example 6 | Example 7 |
|---|---|---|---|---|
| First side (Vehicle outer side) | Number N1 | 50 | 50 | 50 |
|  | Land portion area TS1 | 60 | 60 | 60 |
| Second side (Vehicle inner side) | Number N2 | 20 | 30 | 30 |
|  | Land portion area TS2 | 47 | 50 | 50 |
| (SS1 × TS1)/(SS2 × TS2) |  | 1.05 | 1.0 | 1.0 |
| Rising height H mm |  | 8 | 8 | 8 |
| Ratio L/SH |  | 0.2 | 0.08 | 0.10 |
| Shallow grooved region | Present? | No | No | No |
|  | Ratio of groove depth % | — | — | — |
|  | Ratio of total length % | — | — | — |
| Mud Performance Index value |  | 107 | 106 | 107 |
| Rock performance Index value |  | 102 | 101 | 102 |
| Snow performance Index value |  | 107 | 104 | 104 |
| Uniformity Index value |  | 100 | 104 | 103 |

TABLE 2-1

|  |  | Example 8 | Example 9 | Example 10 | Example 11 |
|---|---|---|---|---|---|
| First side (Vehicle outer side) | Number N1 | 50 | 50 | 50 | 50 |
|  | Land portion area TS1 | 60 | 60 | 60 | 60 |
| Second side (Vehicle inner side) | Number N2 | 30 | 30 | 30 | 30 |
|  | Land portion area TS2 | 50 | 50 | 50 | 50 |
| (SS1 × TS1)/(SS2 × TS2) |  | 1.0 | 1.0 | 1.0 | 1.0 |
| Rising height H mm |  | 8 | 8 | 4 | 5 |
| Ratio L/SH |  | 0.30 | 0.32 | 0.2 | 0.2 |
| Shallow grooved region | Present? | No | No | No | No |
|  | Ratio of groove depth % | — | — | — | — |
|  | Ratio of total length % | — | — | — | — |
| Mud Performance Index value |  | 106 | 106 | 102 | 103 |
| Rock performance Index value |  | 102 | 101 | 100 | 101 |
| Snow performance Index value |  | 106 | 104 | 101 | 102 |
| Uniformity Index value |  | 101 | 100 | 102 | 102 |

TABLE 2-2

|  |  | Example 12 | Example 13 | Example 14 | Example 15 |
|---|---|---|---|---|---|
| First side (Vehicle outer side) | Number N1 | 50 | 50 | 50 | 50 |
|  | Land portion area TS1 | 60 | 60 | 60 | 60 |
| Second side (Vehicle inner side) | Number N2 | 30 | 30 | 30 | 30 |
|  | Land portion area TS2 | 50 | 50 | 50 | 50 |
| (SS1 × TS1)/(SS2 × TS2) |  | 1.0 | 1.0 | 1.0 | 1.0 |
| Rising height H mm |  | 13 | 15 | 8 | 8 |
| Ratio L/SH |  | 0.2 | 0.2 | 0.2 | 0.2 |
| Shallow grooved region | Present | No | No | Yes | Yes |
|  | Ratio of groove depth % | — | — | 40 | 40 |
|  | Ratio of total length % | — | — | 40 | 35 |
| Mud Performance Index value |  | 106 | 107 | 105 | 105 |
| Rock performance Index value |  | 100 | 98 | 103 | 102 |
| Snow performance Index value |  | 102 | 103 | 102 | 102 |
| Uniformity Index value |  | 101 | 100 | 103 | 103 |

TABLE 2-3

|  |  | Example 16 | Example 17 | Example 18 |
|---|---|---|---|---|
| First side (Vehicle outer side) | Number N1 | 50 | 50 | 50 |
|  | Land portion area TS1 | 60 | 60 | 60 |
| Second side (Vehicle inner side) | Number N2 | 30 | 30 | 30 |
|  | Land portion area TS2 | 50 | 50 | 50 |
| (SS1 × TS1)/(SS2 × TS2) |  | 1.0 | 1.0 | 1.0 |
| Rising height H mm |  | 8 | 8 | 8 |
| Ratio L/SH |  | 0.2 | 0.2 | 0.2 |
| Shallow grooved region | Present? | Yes | Yes | Yes |
|  | Ratio of groove depth % | 40 | 40 | 45 |
|  | Ratio of total length % | 25 | 15 | 25 |
| Mud Performance Index value |  | 106 | 107 | 107 |
| Rock performance Index value |  | 102 | 101 | 101 |
| Snow performance Index value |  | 103 | 105 | 105 |
| Uniformity Index value |  | 102 | 101 | 100 |

As can be seen from Tables 1 and 2, as compared with Comparative Example 1, all of Examples 1 to 18 provided improved mud performance and rock performance and snow performance in a well-balanced manner and successfully maintained or improved uniformity. On the other hand, in Comparative Examples 2 and 3, only the side blocks on the first side and the second side of the tire were asymmetric, leading to degraded uniformity. In Comparative Example 4, only the tread portions on the first side and the second side of the tire were asymmetric, leading to degraded uniformity.

The invention claimed is:

1. A pneumatic tire comprising a tread portion extending in a tire circumferential direction and having an annular shape, a pair of sidewall portions respectively disposed on both sides of the tread portion, and a pair of bead portions each disposed on an inner side of the sidewall portions in a tire radial direction,
    a plurality of side blocks that rise from an outer surface of each of the sidewall portions and that are defined by segmentation elements being arranged, along the tire circumferential direction, in each of a pair of side regions adjacent to, on an outer side in a tire width direction, an outermost end portion of the tread portion in the tire width direction, the segmentation elements being a combination of elements selected from the outermost end portion of the tread portion in the tire width direction, grooves extending in the tire circumferential direction or the tire width direction, and sipes extending in the tire circumferential direction or the tire width direction, a number N1 of the side blocks provided in a first side region located on a first side of the pair of side regions in the tire width direction and a number N2 of the side blocks provided in a second side region located on a second side of the pair of side regions in the tire width direction satisfying a relationship N1>N2, a land portion area TS1 in a first tread region of the tread portion located closer to the first side region than a tire equator and a land portion area TS2 in a second tread region of the tread portion located closer to the second side region than the tire equator satisfying TS1>TS2, the land portion area TS1 in the first tread region, the land portion area TS2 in the second tread region, a total area SS1 of the side blocks provided in the first side region, and a total area SS2 of the side blocks provided in the second side region satisfying a relationship $0.95 \leq (SS1 \times TS1)/(SS2 \times TS2) \leq 1.05$, and a ratio L/SH of a vertical distance L, from the outermost end portion in the tire width direction of the tread portion to an innermost point in the tire radial direction of at least one of the side regions, to a tire cross-sectional height SH being from 0.10 to 0.30.

2. The pneumatic tire according to claim 1, wherein an area ratio of land portions to the first tread region and an area ratio of land portions to the second tread region are each from 40% to 60%.

3. The pneumatic tire according to claim 2, wherein a rising height H of the side blocks from an outer surface of each of the sidewall portions is from 5 mm to 13 mm.

4. The pneumatic tire according to claim 3, wherein
the segmentation element partially comprises a shallow grooved region having a groove depth relatively small,
the groove depth of the shallow grooved region is from 40% to 45% of the rising height H of the side blocks from the outer surface of each of the sidewall portions, and a total length of the shallow grooved region along a contour line of a road contact surface of the side blocks is from 15% to 35% of an entire length of the contour line of the road contact surface of the side blocks.

5. The pneumatic tire according to claim 1, wherein a rising height H of the side blocks from an outer surface of each of the sidewall portions is from 5 mm to 13 mm.

6. The pneumatic tire according to claim 1, wherein
the segmentation element partially comprises a shallow grooved region having a groove depth relatively small,
the groove depth of the shallow grooved region is from 40% to 45% of a rising height H of the side blocks from the outer surface of each of the sidewall portions, and a total length of the shallow grooved region along a contour line of a road contact surface of the side blocks is from 15% to 35% of an entire length of the contour line of the road contact surface of the side blocks.

* * * * *